L. KLEIN.
APPARATUS FOR TREATING COFFEE BEANS.
APPLICATION FILED APR. 29, 1911.

1,006,760.

Patented Oct. 24, 1911.

3 SHEETS—SHEET 2.

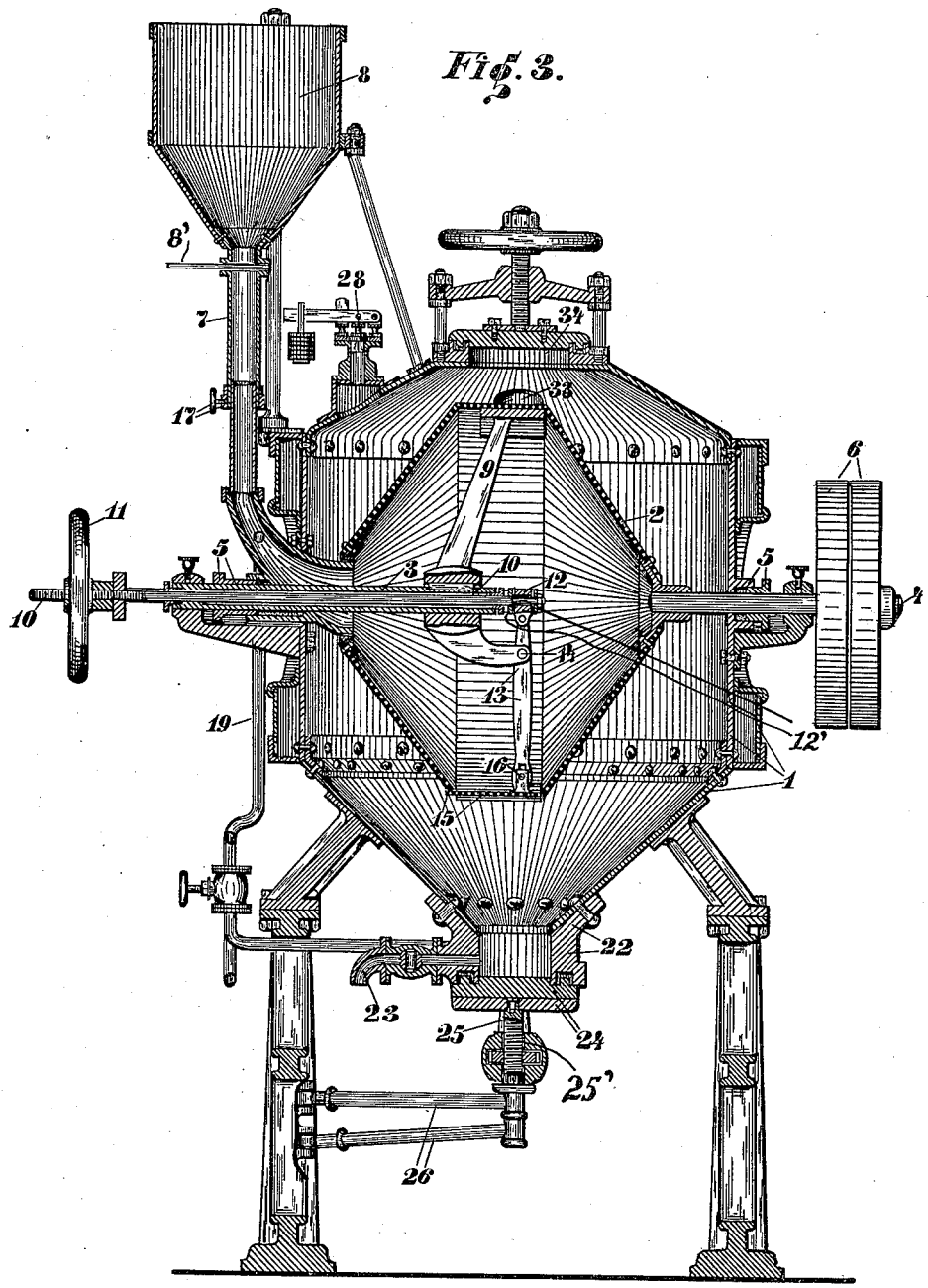

UNITED STATES PATENT OFFICE.

LOUIS KLEIN, OF STRASSBURG, GERMANY.

APPARATUS FOR TREATING COFFEE-BEANS.

1,006,760.  Specification of Letters Patent. Patented Oct. 24, 1911.

Application filed April 29, 1911. Serial No. 624,241.

*To all whom it may concern:*

Be it known that I, LOUIS KLEIN, a subject of the German Emperor, and residing at Strassburg, Germany, have invented certain new and useful Improvements in Apparatus for Treating Coffee-Beans, of which the following is a specification.

The present invention has reference to an improved apparatus for treating coffee beans, and relates more specifically to an apparatus for withdrawing the caffein from coffee beans, and the object of the invention is to provide means whereby the beans are successively subjected to the several treatments, which they have to undergo in order to be rendered caffein-free, in one and the same apparatus. Such an improved apparatus is especially adapted in carrying out my process as described in an application for Letters Patent filed by me on Oct. 5, 1910, Serial No. 585,514.

In order to make my invention more readily understood, I will now describe it with reference to the accompanying drawings, in which—

Figure 1:
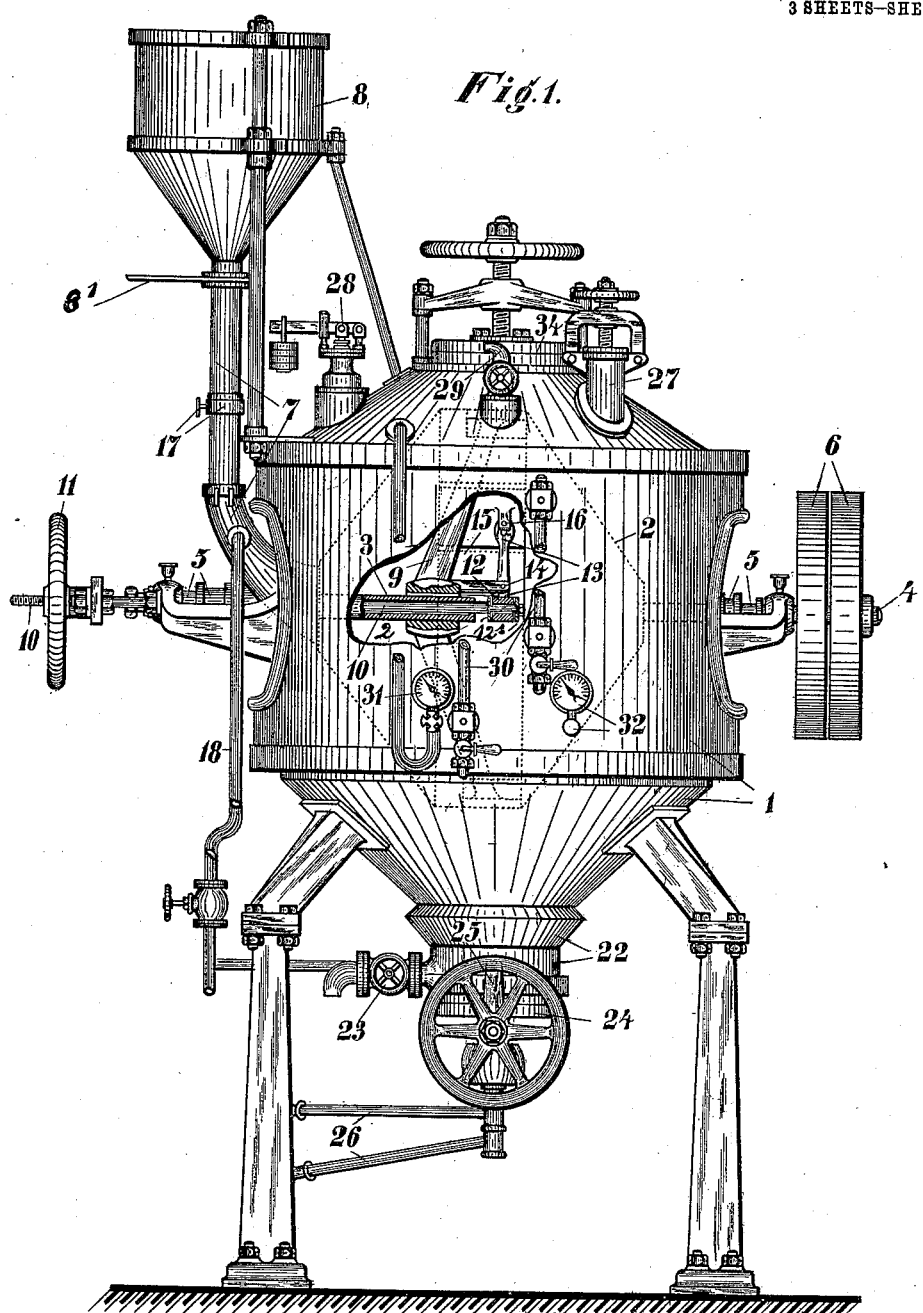
Figure 2:
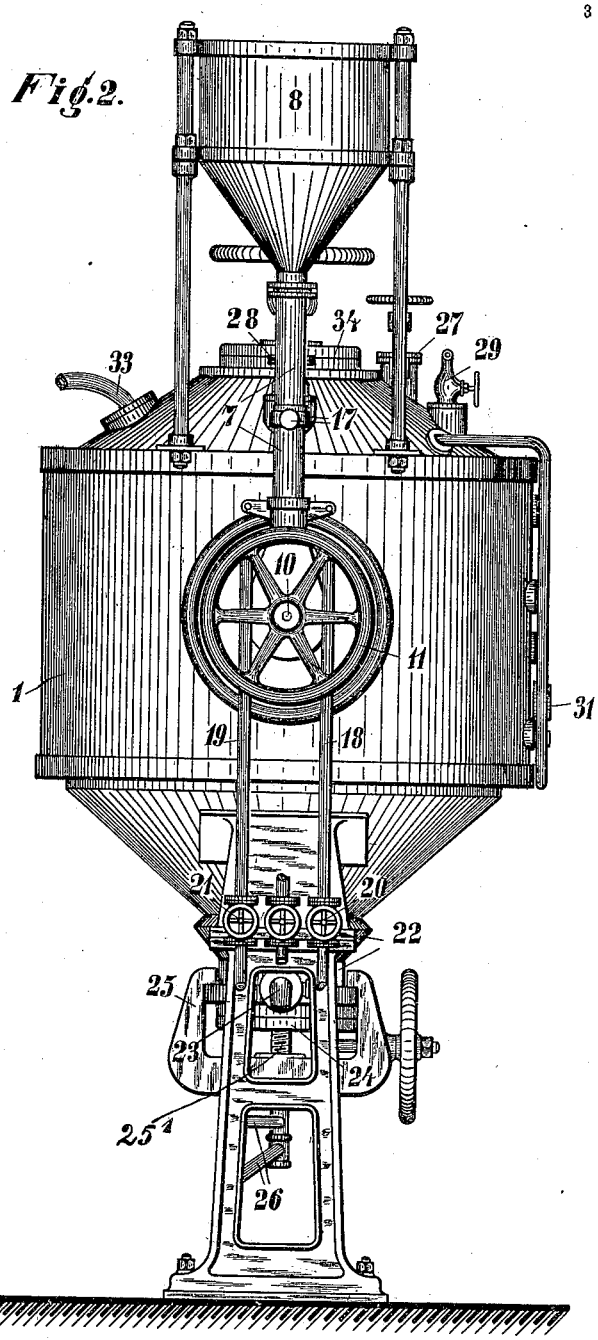

Figure 1 represents a front elevation of the apparatus, with a portion of the walls of the container and inclosed drum removed to expose internal parts, which latter are shown partly in section; Fig. 2 shows a side elevation of the apparatus. Fig 3 shows a vertical section through the center of the machine.

In the container 1 is rotatably journaled the drum 2 having walls perforated in the manner of a sieve and the rotary shaft of which is composed of two parts 3 and 4, which respectively extend outwardly through stuffing boxes 5, 5, the part 4 carrying fixed and loose pulleys 6, as shown in Fig. 1. Into this drum 2 opens the neck 7 of the hopper 8 containing a supply of the material to be treated. The drum itself is supported by arms 9 radiating from the shaft part 3. The latter is hollow and surrounds a spindle 10 which can be axially displaced by means of the hand-wheel 11. This longitudinal displacement of the spindle serves to operate the device for opening and closing apertures in the drum wall for the purpose of discharging the treated contents. To this end a sleeve 12 is loosely mounted on the inner end of the spindle between flanges 12′. Forked levers 13, fulcrumed at 14, are pivotally secured at one end to this sleeve 12 and at the other end to a slide 15, whose stud 16 coöperates with a slot in the respective lever end. The slides close discharge openings in the drum. Upon manipulation of the handwheel 11 the sleeve is laterally shifted whereby the levers 13 are swung about the fulcrum 14 and thus cause opening or closing respectively of the discharge openings.

The telescope neck 7 of the supply hopper 8 is provided with a closing slide 8′ and a locking device 17. Into the lower part of the tube 7 open two conduits, the one —18— serving to introduce steam, anl the other —19— water, into the neck and then into the drum. 20 and 21 denote valves for these conduits. At the lower, funnel-shaped part of the container 1 there is provided a mouthpiece 22 with lateral discharge cock 23 for liquids. A plate 24, closing the lower end of the container, is held in position by means of a clamping yoke 25 with screw spindle 25′ supported by the swing brackets 26, and can be swung sidewise for the purpose of removing a finished charge from the container. In the cover of the latter are provided a closable port 27, a safety valve 28, a steam or air escape valve 29, a gage 30, a manometer 31, a thermometer 32, and a tube 33 which communicates with an air compressor, not shown. For cleaning purposes access to the interior can be had through the hand- or man-hole 34, which is ordinarily closed in any suitable manner.

The operation of the described apparatus is as follows: Raw coffee beans are filled into the hopper and from there, upon the slide 8′ being opened, fall through the telescope neck 7 into the perforated drum 2. The liquids and pressure media, necessary for bringing about the extraction of the caffein (water, alkaline solutions or mixtures, steam, pressure air and the like) are then introduced in the required succession through port 27 and the conduits 18, 19 and 33 into the air- and liquid-tight container 1. After each step the liquids are run off through cock 23, and the pressure medium is let off through valve 29. At the completion of the process the caffein-freed charge is then emptied out of the drum 2 first into the container 1 by opening the slides 15 by means of the handwheel 11, and then out of the container by loosening and swinging-out the bottom plate 24. The treatment of the beans with steam causes them to swell up, and the introduction of a pressure agent serves to quicken the discharge of the extraction medium.

What I claim is:—

1. In an apparatus for treating coffee beans, in combination, a container; a drum rotatably journaled therein; discharge means in said drum; means for operating these discharge means from without said container; and filling means partly without and partly within said container and communicating with said drum, substantially as set forth.

2. In an apparatus for treating coffee beans, in combination, a fluid- and air-tight container; a two-part shaft rotatably journaled therein; a drum supported on said shaft; discharge means in said drum, comprising slides in the walls thereof, and lever mechanisms operated from without said container; and adjustable filling means for said drum, substantially as set forth.

3. In an apparatus for treating coffee beans, in combination, a container; inlet and outlet ports, safety, regulating and cleaning devices thereon; a two-part shaft passing horizontally through said container; means for driving said shaft; arms radiating from it; a perforated drum supported by said arms; a screw spindle passing centrally through the one hollow part of said shaft; external means for rotating said spindle; flanges on the inner end thereof; a sleeve loosely riding between these flanges; levers engaging said sleeve and fulcrumed partways down their length; slides in the wall of said drum; and actuating connections between said slides and said levers, substantially as set forth.

In testimony whereof I affix my signature in presence of two witnesses.

LOUIS KLEIN.

Witnesses:
 JOSEPH ROHMER,
 AUGUST OOSTERMAN.

---

Copies of this patent may be obtained for five cents each, by addressing the "Commissioner of Patents, Washington, D. C."